(12) United States Patent
Sasaki

(10) Patent No.: US 12,678,864 B2
(45) Date of Patent: Jul. 14, 2026

(54) CUTTING INSERT

(71) Applicant: TUNGALOY CORPORATION,
Fukushima (JP)

(72) Inventor: Yasutake Sasaki, Iwaki (JP)

(73) Assignee: TUNGALOY CORPORATION,
Fukushima (JP)

( * ) Notice: Subject to any disclaimer, the term of this
patent is extended or adjusted under 35
U.S.C. 154(b) by 447 days.

(21) Appl. No.: 18/452,791

(22) Filed: Aug. 21, 2023

(65) Prior Publication Data

US 2024/0100607 A1 Mar. 28, 2024

(30) Foreign Application Priority Data

Sep. 28, 2022 (JP) ................................. 2022-154520

(51) Int. Cl.
*B23B 27/16* (2006.01)
*B23B 27/04* (2006.01)

(52) U.S. Cl.
CPC ....... *B23B 27/1611* (2013.01); *B23B 2200/24*
(2013.01)

(58) Field of Classification Search
CPC ............... B23B 27/1611; B23B 27/045; B23B
2200/24; B23B 2200/082; B23B
2200/321; B23B 2226/125; B23B
2240/08
See application file for complete search history.

(56) References Cited

U.S. PATENT DOCUMENTS

| | | | | |
|---|---|---|---|---|
| 5,676,495 A | * | 10/1997 | Katbi | B23B 27/045 |
| | | | | 407/115 |
| 7,510,355 B2 | * | 3/2009 | Havrda | B23B 27/045 |
| | | | | 407/115 |
| 7,665,933 B2 | * | 2/2010 | Nagaya | B23B 27/045 |
| | | | | 407/116 |
| 9,346,104 B2 | * | 5/2016 | Inoue | B23B 27/143 |
| 12,226,837 B2 | * | 2/2025 | Zhang | B23B 27/22 |
| 2006/0269367 A1 | | 11/2006 | Havrda | |
| 2008/0240875 A1 | | 10/2008 | Nagaya et al. | |
| 2015/0158088 A1 | * | 6/2015 | Inoue | B23B 27/143 |
| | | | | 407/115 |

(Continued)

FOREIGN PATENT DOCUMENTS

| | | |
|---|---|---|
| CN | 104411431 A | 3/2015 |
| CN | 111730079 A | 10/2020 |
| JP | H08168902 A * 7/1996 | ........... B23B 27/045 |

(Continued)

*Primary Examiner* — Bayan Salone
(74) *Attorney, Agent, or Firm* — Studebaker Brackett
PLLC

(57) ABSTRACT

A cutting insert capable of performing groove machining
while efficiently fragmenting chip is provided. A cutting
insert 10 includes a front cutting edge 111, a pair of side
cutting edges 113, a pair of corner cutting edges 112 each
connecting the front cutting edge and a corresponding one of
the side cutting edges, corner rake surfaces 122 extending
from the corner cutting edges 112, and a protrusion part 150
protruding from the corner rake surfaces 122 and provided
with a flat boss surface 160 at a leading end. Corner wall
surfaces 180 extending from the boss surface 160 toward the
corner rake surfaces 122 are formed at the protrusion part
150. At least a part of the corner wall surfaces 180 has a tilt
angle of 40° or larger relative to the boss surface 160.

6 Claims, 7 Drawing Sheets

(56) References Cited

U.S. PATENT DOCUMENTS

2022/0274185 A1\* 9/2022 Suzuki .................. B23B 27/141
2022/0314335 A1\* 10/2022 Zhang ..................... B23B 27/22

FOREIGN PATENT DOCUMENTS

JP              2022130807 A  \*  9/2022  ............. B23B 27/00
WO      WO-2014017623 A1 \*  1/2014  ........... B23B 27/045
WO             2022/017176 A1    1/2022

\* cited by examiner

CUTTING INSERT

BACKGROUND OF THE INVENTION

Field of the Invention

The present invention relates to a cutting insert used for groove machining.

Description of the Related Art

As described in, for example, U.S. Patent Application Publication No. 2006/0269367, a cutting insert used for groove machining includes a plurality of cutting edges such as a front cutting edge and a corner cutting edge disposed in accordance with the inner surface shape of a groove. The "groove machining" includes not only fabrication that forms a new groove at a surface of a workpiece from scratch but also fabrication that finishes the inner surface of a groove formed at the workpiece in advance.

As described in U.S. Patent Application Publication No. 2006/0269367 described above, a certain cutting insert includes a chip breaker for fragmenting chip generated during fabrication. A surface that functions as the chip breaker typically has a relatively small tilt angle to reduce resistance during fabrication.

However, when the above-described tilt angle is too small, the chip breaker's function of fragmenting chip is not sufficiently exerted in some cases. In particular, when the inner surface of a groove formed in advance is to be finished, chip fragmentation by a chip breaker is highly likely to not sufficiently performed with the cutting insert described in U.S. Patent Application Publication No. 2006/0269367 described above.

The present invention is intended to provide a cutting insert capable of performing groove machining while efficiently fragmenting chip.

SUMMARY OF THE INVENTION

A cutting insert according to the present invention is a cutting insert used for groove machining and includes a front cutting edge, a pair of side cutting edges, a pair of corner cutting edges each connecting the front cutting edge and a corresponding one of the side cutting edges, corner rake surfaces extending from the corner cutting edges, and a protrusion part protruding from the corner rake surfaces and provided with a flat boss surface at a leading end. Corner wall surfaces extending from the boss surface toward the corner rake surfaces are formed at the protrusion part. At least a part of the corner wall surfaces has a tilt angle of 40° or larger relative to the boss surface.

In a case in which the inner surface of a groove formed in advance is to be finished, the inner side surface of the groove or the like is fabricated mainly by a corner cutting edge of a cutting insert. In this case, chip generated from the corner cutting edge is more likely to grow in an irregular direction than in a case in which a new groove is formed from scratch. Thus, when the tilt angle of a surface that functions as a chip breaker is relatively small as in conventional cases, the chip is potentially not sufficiently fragmented by the chip breaker.

Thus, in the cutting insert configured as described above, the tilt angle of each corner wall surface that functions as a chip breaker, in other words, the tilt angle of each corner wall surface relative to the boss surface is 40° or larger. With this configuration, in whichever direction chip is generated from the corner cutting edges, it is possible to perform groove machining while holding and efficiently fragmenting the chip.

In a more preferable aspect, the corner wall surfaces each may include a first corner wall surface and a second corner wall surface, the first corner wall surface being a part on the boss surface side, the second corner wall surface being a part on the rake surface side, and a tilt angle of the second corner wall surface relative to the boss surface may be smaller than a tilt angle of the first corner wall surface relative to the boss surface.

In a more preferable aspect, at least one of the first corner wall surface and the second corner wall surface may protrude in a circular arc shape toward the corner cutting edge when viewed in a direction perpendicular to the boss surface.

In a more preferable aspect, a first part being provided with the front cutting edge, the side cutting edges, the corner cutting edges, the corner rake surfaces, and the protrusion part, and a second part being held by a holder of a cutting tool may be joined to each other.

In a more preferable aspect, the first part may be formed of a material containing cubic boron nitride.

According to the present invention, a cutting insert capable of performing groove machining while efficiently fragmenting chip is provided.

DETAILED DESCRIPTION OF THE PREFERRED EMBODIMENTS

Figure 1:
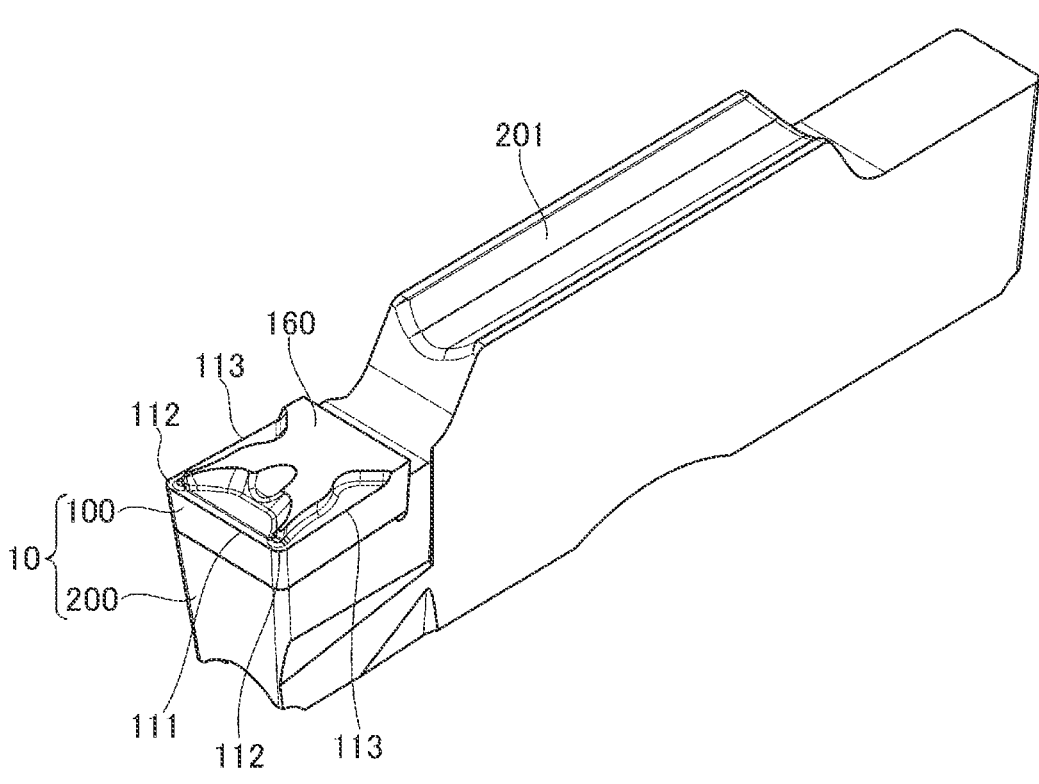
FIG. 1 is a perspective view illustrating the configuration of a cutting insert according to the present embodiment.

The present embodiment will be described below with reference to the accompanying drawings. To facilitate understanding of description, any identical components in the drawings are denoted by the same reference sign as much as possible, and duplicate description thereof is omitted.

A cutting insert 10 according to the present embodiment is used mainly when groove machining is performed. When a workpiece is to be grooved, the cutting insert 10 is attached and held to a non-illustrated cutting tool and in this state, its cutting edge (such as a front cutting edge 111 to be described later) is brought into contact with the workpiece. The "groove machining" performed by the cutting insert 10 includes not only fabrication that forms a new groove at the surface of the workpiece from scratch but also fabrication that finishes the inner surface of a groove formed at the workpiece in advance. The cutting insert 10 is configured to mainly perform the latter groove machining.

As illustrated in FIG. 1, the cutting insert 10 includes a body part 200 and a chip 100, and these components are joined (specifically, brazed) to each other.

The body part 200 is a part that is held by a holder of the non-illustrated cutting tool. In FIG. 1, recessed parts that are retracted in circular arc shapes are formed on the upper and lower sides, respectively, of a part denoted by reference sign "201" (hereinafter also referred to as a "central part 201"). In a state in which the body part 200 is held by the holder of the cutting tool, part of the cutting tool is positioned inside the recessed parts, and accordingly, the body part 200 is fixed. The body part 200 corresponds to a "second part" in the present embodiment.

The chip 100 is a part that forms a groove by directly touching the workpiece. The chip 100 is entirely formed of a sintered body of cubic boron nitride (cBN) and brazed to the body part 200. The chip 100 corresponds to a "first part" in the present embodiment. The material of the chip 100 may be a material containing only cubic boron nitride as in the present embodiment but may be a material containing any other element in addition to cubic boron nitride.

Figure 2:
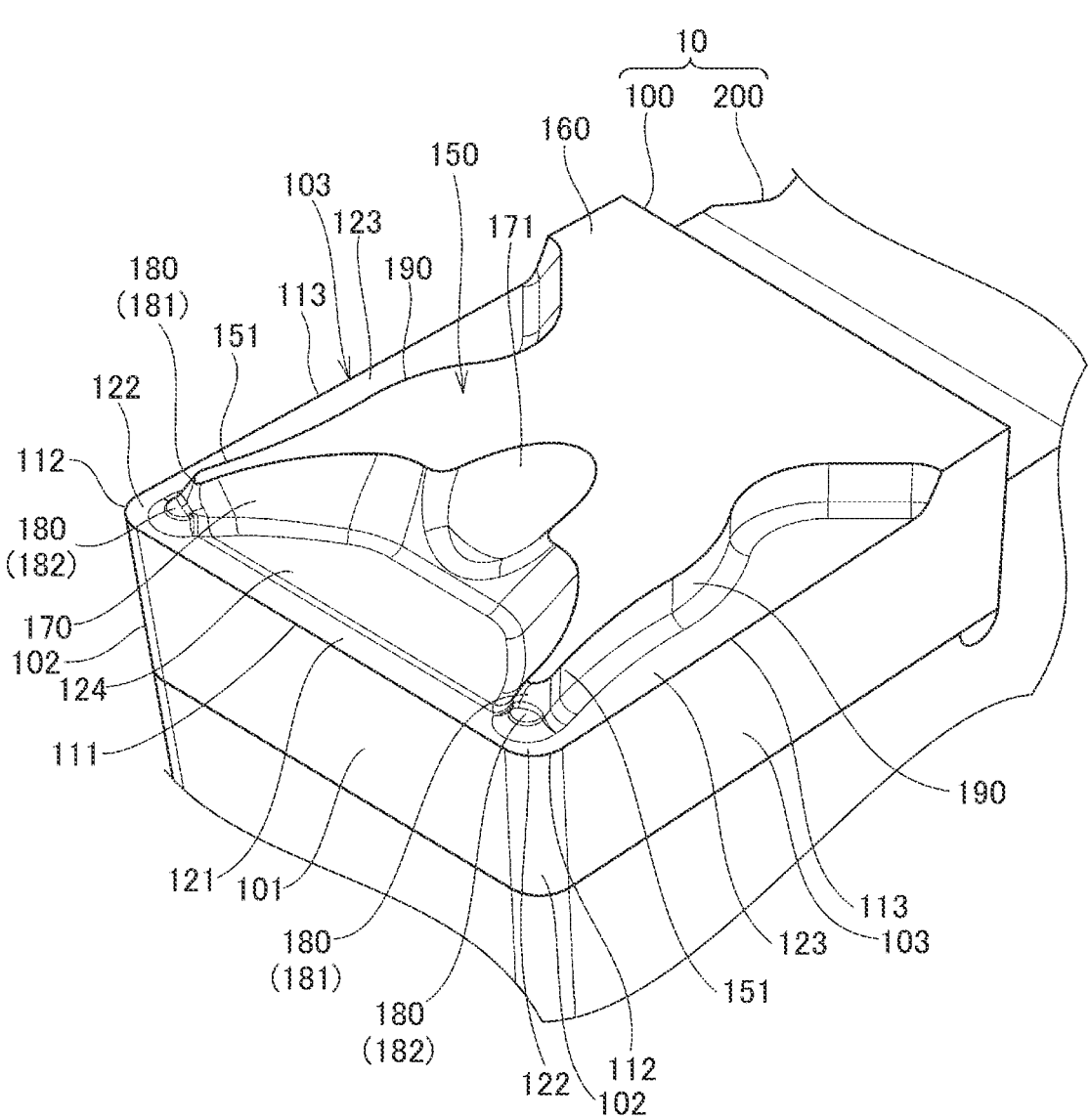
FIG. 2 is an enlarged diagram illustrating a part of the cutting insert illustrated in FIG. 1.
Figure 3:
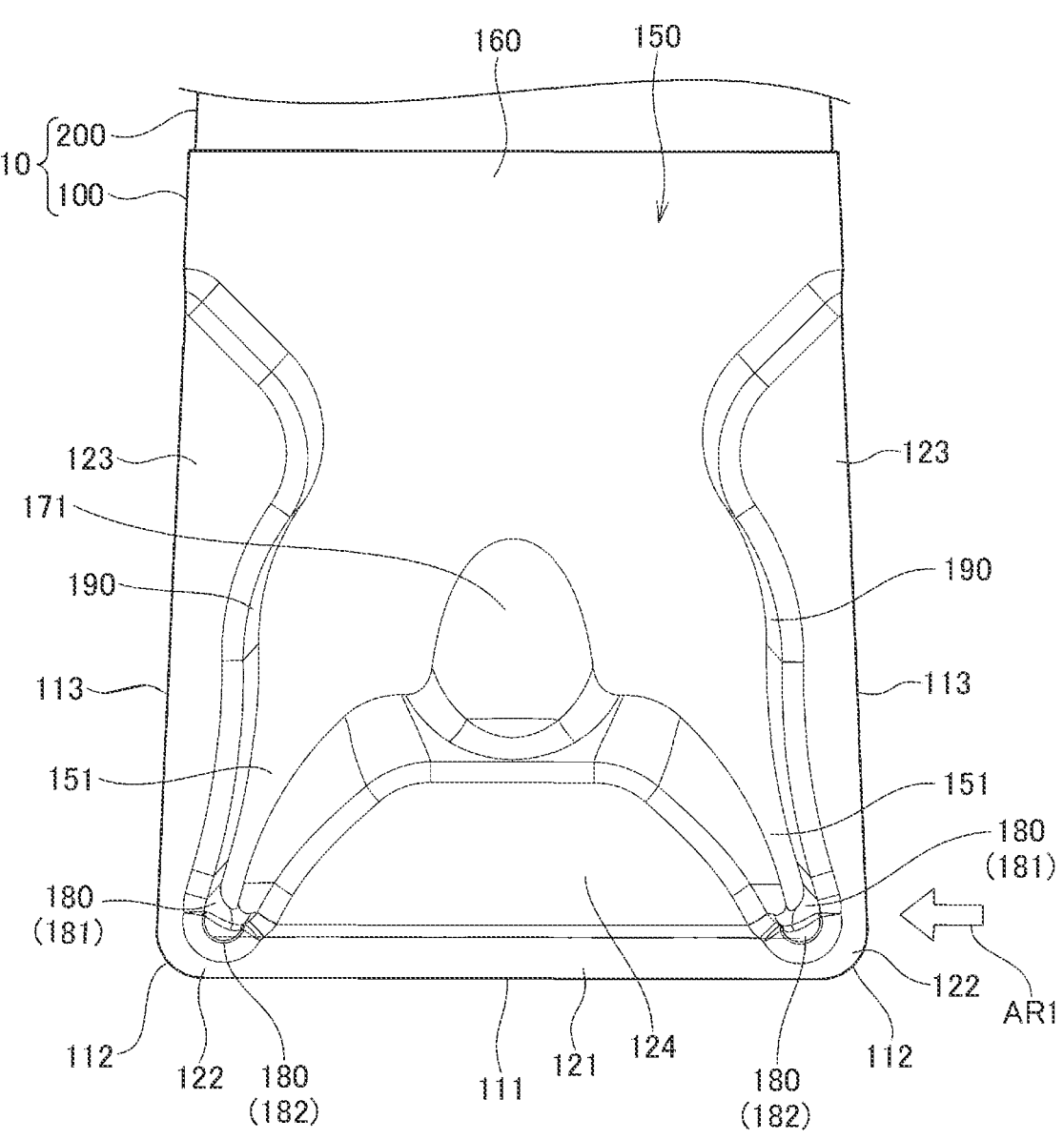
FIG. 3 is a diagram of the part illustrated in FIG. 2 when viewed in a direction perpendicular to a boss surface.

FIG. 2 is an enlarged diagram illustrating a part including the chip 100 and its vicinity in FIG. 1. FIG. 3 is a diagram of the part illustrated in FIG. 2 when viewed in a direction perpendicular to a boss surface 160 of the chip 100. As illustrated in FIGS. 2 and 3, the chip 100 includes the front cutting edge 111, side cutting edges 113, and corner cutting edges 112. These cutting edges are formed to extend along sides zoning an upper-surface-side part of the chip 100 in a substantially rectangular parallelepiped shape in FIG. 2.

The front cutting edge 111 is a cutting edge provided to extend straight in a direction orthogonal to the longitudinal direction of the body part 200 at an end part of the chip 100 on a leading end side. In the following description, the direction in which the front cutting edge 111 extends is also referred to as a "width direction". The front cutting edge 111 is a part that faces the bottom surface of a groove during groove machining.

The side cutting edges 113 are a pair of cutting edges provided at positions on respective sides of the chip 100 in the width direction. Each side cutting edge 113 extends straight from a leading-end-side part where the front cutting edge 111 is positioned toward the central part 201. As illustrated in FIG. 3, the direction in which each side cutting edge 113 extends is not orthogonal to but slightly tilted relative to the direction in which the front cutting edge 111 extends. As a result, the interval between the side cutting edges 113 is slightly shorter at a position farther from the leading end side and closer to the central part 201 side. The side cutting edges 113 are parts that face inner side surfaces of a groove during groove machining.

The corner cutting edges 112 are each a cutting edge having a circular arc shape and provided to smoothly connect the front cutting edge 111 and the corresponding side cutting edge 113. The corner cutting edges 112 are provided at positions at respective ends of the front cutting edge 111. The corner cutting edges 112 are each a part that faces a corner of a groove between the bottom surface and the corresponding inner side surface during groove machining. As described later, the corner cutting edges 112 are also parts used for fabrication that finishes the inner side surfaces and bottom surface of the groove.

The chip 100 is provided with a front rake surface 121, a front flank surface 101, side rake surfaces 123, side flank surfaces 103, corner rake surfaces 122, and corner flank surfaces 102. The front rake surface 121 and the front flank surface 101 correspond to the front cutting edge 111. The front rake surface 121 is a flat surface extending from the front cutting edge 111 toward the central part 201 side, and the front flank surface 101 is a flat surface extending from the front cutting edge 111 toward the lower side in FIG. 2. The front rake surface 121 and the front flank surface 101 are orthogonal to each other in the present embodiment.

A rake surface 124 is provided at a position adjacent to the front rake surface 121 on the central part 201 side. The rake surface 124 is a tilt surface further retracted toward the lower side in FIG. 2 at a position closer to the central part 201 side.

The side rake surfaces 123 and the side flank surfaces 103 correspond to the side cutting edges 113. The side rake surfaces 123 are flat surfaces extending from the side cutting edges 113 toward the center side in the right-left direction in FIG. 3. The side flank surfaces 103 are flat surfaces extending from the side cutting edges 113 toward the lower side in FIG. 2. Each side rake surface 123 and the corresponding side flank surface 103 have an acute angle therebetween in the present embodiment.

The corner rake surfaces 122 and the corner flank surfaces 102 correspond to the corner cutting edges 112. The corner rake surfaces 122 are flat surfaces extending from the corner cutting edges 112 toward the inner side, specifically, toward arms 151 to be described later. Each corner rake surface 122 connect the front rake surface 121 and the corresponding side rake surface 123 described above. The front rake surface 121, the corner rake surfaces 122, and the side rake surfaces 123 are flush surfaces at the same height position. The corner flank surfaces 102 extend from the corner cutting edges 112 toward the lower side in FIG. 2 and have shapes curved in accordance with the shapes of the corner cutting edges 112. Each corner rake surface 122 and the corresponding corner flank surface 102 have an acute angle therebetween in the present embodiment.

As illustrated in, for example, FIG. 2, a protrusion part 150 is provided on a surface of the chip 100 where the corner rake surfaces 122 and the like are positioned. The protrusion part 150 protrudes from the corner rake surfaces 122 and the like toward the upper side in FIG. 2 and is provided with the flat boss surface 160 at a leading end. The front rake surface 121, the corner rake surfaces 122, and the side rake surfaces 123 described above are each parallel to the boss surface 160. The protrusion part 150 is provided with a pair of arms 151 extending toward the respective corner cutting edges 112 when viewed in a direction perpendicular to the boss surface 160 as illustrated in FIG. 3.

Each side surface of the protrusion part 150 extending from the boss surface 160 toward the front rake surface 121 and the like is a wall surface that functions as a "chip breaker" for fragmenting chip generated at cutting edges.

Among these wall surfaces, a front wall surface 170 extending from the leading end side of the boss surface 160 toward the rake surface 124 is provided between the pair of arms 151 and thus retracted in a concave shape from the front cutting edge 111 side toward the central part 201 side. The front wall surface 170 functions as a chip breaker for fragmenting chip generated mainly at the front cutting edge 111. A recessed part 171 formed at the boss surface 160 connects to a central part of the front wall surface 170 in the width direction. The tilt angle of the recessed part 171 relative to the boss surface 160 is smaller than the tilt angle of the front wall surface 170 relative to the boss surface 160.

Corner wall surfaces 180 extending from a part of the boss surface 160 at leading ends of the arms 151 toward the corner rake surfaces 122 function as chip breakers for fragmenting chip generated mainly at the corner cutting edges 112.

Figure 4:
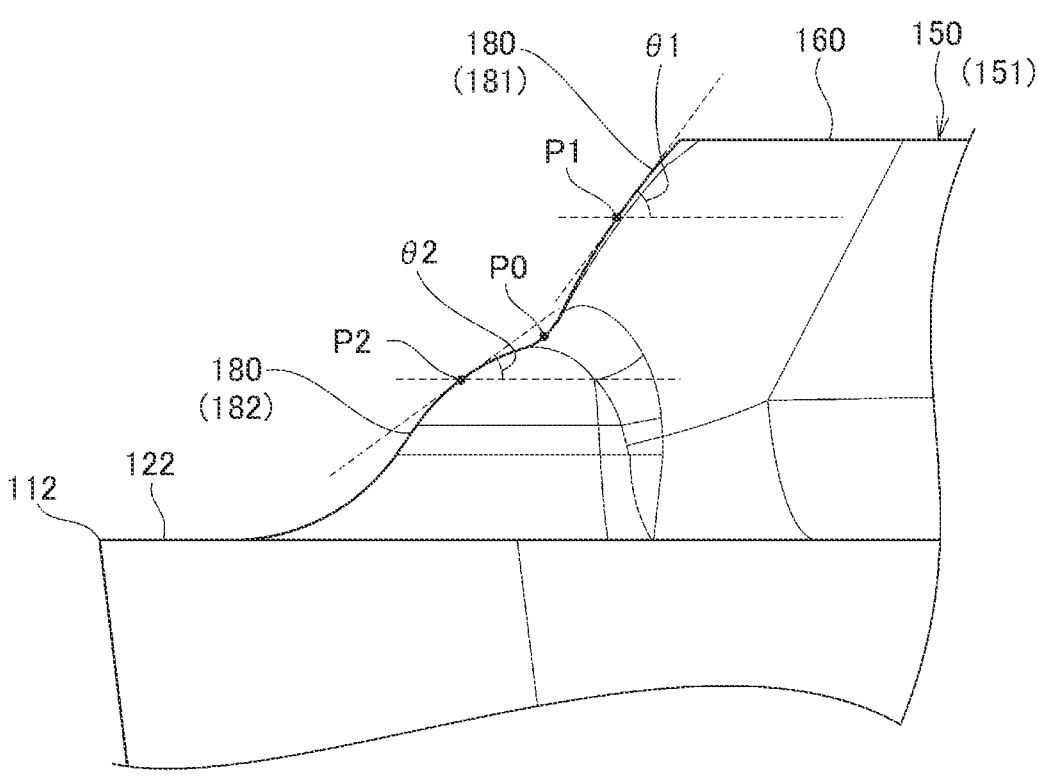
FIG. 4 is a diagram of a part of the cutting insert illustrated in FIG. 3 when viewed along an arrow in FIG. 3.

FIG. 4 is a diagram indicating the corner wall surfaces 180 and its vicinity when viewed along an arrow AR1 in FIG. 3. As illustrated in FIG. 4, each corner wall surface 180 is formed as a two-step protrusion constituted by a first corner wall surface 181 and a second corner wall surface 182. A point P0 in FIG. 4 represents a boundary position between the first corner wall surface 181 and the second corner wall surface 182. The first corner wall surface 181 is a part of the corner wall surface 180 on the boss surface 160 side, and the second corner wall surface 182 is a part of the corner wall surface 180 on the corner rake surfaces 122 side.

A point P1 illustrated in FIG. 4 represents a specific position on the first corner wall surface 181. An angle $\theta1$ illustrated in FIG. 4 represents the tilt angle of the first corner wall surface 181 relative to the boss surface 160 at the position of the point P1. Specifically, the "tilt angle" is an angle between the boss surface 160 and a tangent plane contacting the first corner wall surface 181 at the position of the point P1.

The first corner wall surface 181 is formed such that the above-described tilt angle $\theta1$ is 40° to 90° inclusive wherever the point P1 is located. In other words, the first corner wall surface 181 is formed such that the tilt angle $\theta1$ is 40° to 90° inclusive in the entire region. Instead of this aspect, the region in which the tilt angle $\theta1$ is 40° to 90° inclusive may be a partial region instead of the entire region of the first corner wall surface 181. The tilt angle $\theta1$ is more preferably 45° to 90° inclusive.

A point P2 illustrated in FIG. 4 represents a specific position on the second corner wall surface 182. An angle $\theta2$ illustrated in FIG. 4 represents the tilt angle of the second corner wall surface 182 relative to the boss surface 160 at the position of the point P2. The "tilt angle" is defined as described above. Specifically, the tilt angle $\theta2$ is an angle between the boss surface 160 and a tangent plane contacting the second corner wall surface 182 at the position of the point P2.

The second corner wall surface 182 is formed such that the above-described tilt angle $\theta2$ is smaller than the tilt angle $\theta2$ of the first corner wall surface 181. In the present embodiment, the shape of each corner wall surface 180 is determined so that such a magnitude relation between the tilt angles $\theta1$ and $\theta2$ holds irrespective of selection of the point P1 on the first corner wall surface 181 and selection of the point P2 on the second corner wall surface 182. Instead of this aspect, a region in which the tilt angle $\theta2$ is equal to or larger than the tilt angle $\theta1$ may exist on part of the second corner wall surface 182. However, in any case, the average value of the tilt angle $\theta2$ on the entire second corner wall surface 182 is preferably smaller than the average value of the tilt angle $\theta1$ on the entire first corner wall surface 181. The "average value of the tilt angle $\theta2$" may be, for example, a value obtained by dividing the sum of the maximum and minimum values of the tilt angle $\theta2$ by two or may be a value obtained by dividing the surface integral of the tilt angle $\theta2$ over the entire second corner wall surface 182 by the surface area of the second corner wall surface 182. This is the same for the "average value of the tilt angle $\theta1$".

As illustrated in FIG. 3, the first corner wall surface 181 and the second corner wall surface 182 each protrude in a circular arc shape toward the corresponding corner cutting edge 112 when viewed in the direction perpendicular to the boss surface 160. Only one of the first corner wall surface 181 and the second corner wall surface 182 may protrude in a circular arc shape toward the corresponding corner cutting edge 112. A reason for the above-described shapes of the first corner wall surface 181 and the second corner wall surface 182 will be described later.

Description continues with reference to FIG. 2. Side wall surfaces 190 extending from outer end parts of the boss surface 160 in the width direction toward the side rake surfaces 123 function as chip breakers for fragmenting chip generated mainly at the side cutting edges 113. In the present embodiment, the tilt angle of each side wall surface 190 relative to the boss surface 160 is 90°.

Figure 5:
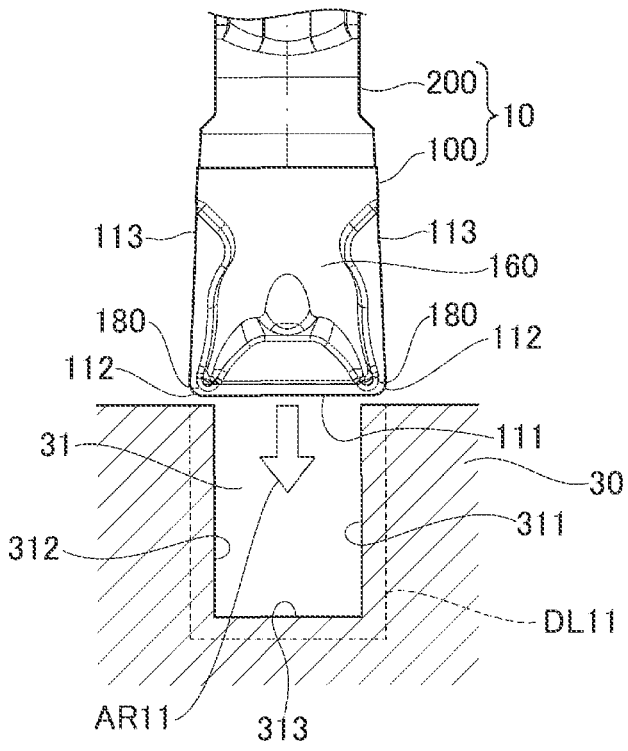
FIG. 5 is a diagram for describing an aspect of groove machining performed by the cutting insert according to the present embodiment.

Functions of components of the cutting insert 10 when groove machining is performed will be described below. The following description is made on an example in which the inner surface of a groove 31 formed at a workpiece 30 in advance is provided with finishing fabrication with the cutting insert 10. As illustrated in FIG. 5, the groove 31 has a substantially rectangular section in a direction orthogonal to its longitudinal direction and has a pair of inner side surfaces 311 and 312 facing each other and a bottom surface 313.

A range illustrated with a dotted line DL11 in FIG. 5 represents a part of the workpiece 30 to be removed by finishing fabrication. The thickness of this part is exaggerated for sake of simplicity of illustration in FIG. 5, but the thickness of a part actually removed by finishing fabrication is smaller than the thickness illustrated in FIG. 5.

In the example illustrated in FIG. 5, the distance (hereinafter also referred to as a "groove width" of the groove 31) from the inner side surface 311 to the inner side surface 312 is slightly smaller than the dimension of the chip 100 in the width direction. In this case, the cutting insert 10 is first moved in the direction of an arrow AR11 while the workpiece 30 is rotated, and accordingly, finishing fabrication is performed on the inner side surfaces 311 and 312 simultaneously. The finishing fabrication on the inner side surfaces 311 and 312 is performed mainly by the corner cutting edges 112 on the respective sides of the chip 100.

Chip generated at the corner cutting edges 112 contacts the corner wall surfaces 180 right after the generation and deforms along the surface shapes of the corner wall surfaces 180. Specifically, the chip deforms to have a curved section in a direction orthogonal to its longitudinal direction. The chip deformed in this manner easily breaks into a fragmented state when receiving force in a bending direction.

As described above, in the present embodiment, since the first corner wall surface 181 and the second corner wall surface 182 have shapes protruding in circular arc shapes toward the corresponding corner cutting edge 112, chip generated in finishing fabrication of the inner side surfaces 311 and 312 can be reliably fragmented.

The direction in which chip generated at each corner cutting edge 112 extends is different depending on conditions of finishing fabrication. For example, when the feeding speed of the cutting insert 10 is fast or when the cutting amount thereof is large, the chip is likely to extend from the corner cutting edge 112 toward the first corner wall surface 181. Oppositely, for example, when the feeding speed of the cutting insert 10 is low or when the cutting amount is small, the chip is likely to extend from the corner cutting edge 112 toward the second corner wall surface 182. However, in any case, the chip is likely to extend from the corner cutting edge 112 in an irregular direction when finishing fabrication of the groove 31 is performed as in the present embodiment.

Thus, in the cutting insert 10 of the present embodiment, each corner wall surface 180 that functions as a chip breaker is formed as a two-step protrusion constituted by the first corner wall surface 181 and the second corner wall surface 182, and the tilt angle of a part relative to the boss surface 160 is larger than 40°. With such a configuration, the chip breaker more strongly holds chip, and accordingly, groove machining can be performed while the chip is efficiently fragmented.

In a case of a low fabrication condition, for example, when the feeding speed of the cutting insert 10 is low, chip generated at each corner cutting edge 112 is likely to extend by a small amount from the corner cutting edge 112 toward the corresponding corner wall surface 180 and then extend in an irregular direction before reaching the corner wall surface 180. Thus, in the present embodiment, the second corner wall surface 182 having a relatively small tilt angle θ2 is provided at a part of the corner wall surface 180 on the corner rake surface 122 side. Accordingly, the distance from the corner cutting edge 112 to the corner wall surface 180 is short, and thus chip generated at the corner cutting edge 112 can be reliably held by the corner wall surface 180 and fragmented.

Even in a case of a low fabrication condition, part of chip generated at each corner cutting edge 112 can extend over the second corner wall surface 182. In this case, the chip can be reliably fragmented by the first corner wall surface 181 positioned on the inner side of the second corner wall surface 182.

The second corner wall surface 182 is unnecessary in some cases depending on the range of an employed fabrication condition. In this case, such a shape may be employed that the tilt angle relative to the boss surface 160 is 40° to 90° inclusive at all positions on the corner wall surface 180. In other words, the entire corner wall surface 180 may be the first corner wall surface 181 of the present embodiment.

In the example illustrated in FIG. 5, when the cutting insert 10 is moved in the direction of the arrow AR11, the front cutting edge 111 finally reaches the bottom surface 313. Subsequently, finishing fabrication of the bottom surface 313 is performed by the front cutting edge 111.

In this process, chip generated at the front cutting edge 111 is supported at two points with its end parts in the width direction contacting the respective corner wall surfaces 180, and accordingly, is entirely curved. While being curved, the chip contacts the front wall surface 170 as a chip breaker and is fragmented. In this process, scraping potentially occurs when the chip contacts the rake surface 124, but in the present embodiment, such scraping is avoided since the rake surface 124 is tilted and retracted on the lower side.

Figure 6A:
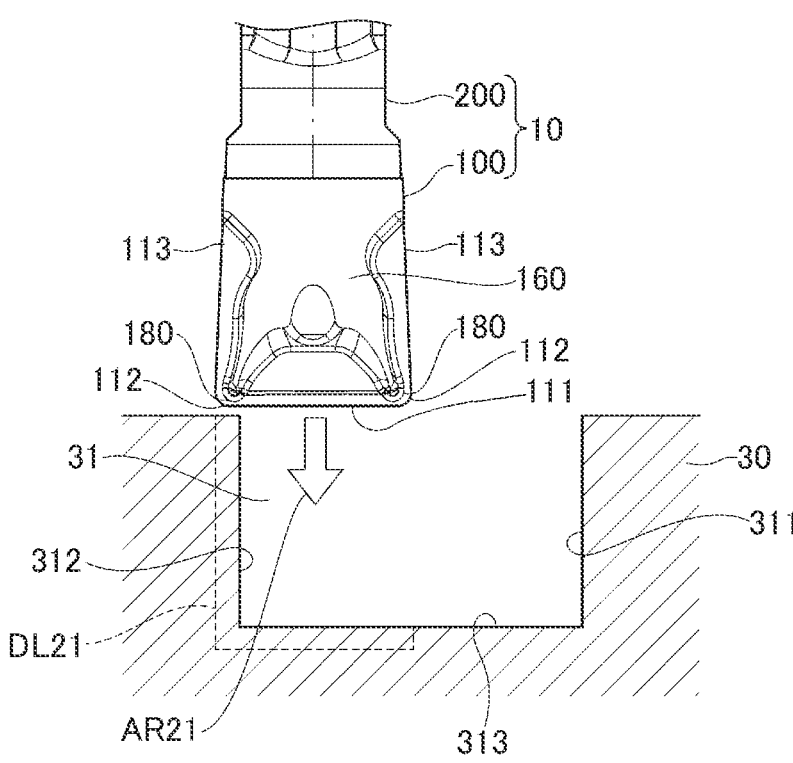
FIGS. 6A-6B are diagrams for describing an aspect of groove machining performed by the cutting insert according to the present embodiment.
Figure 6B:
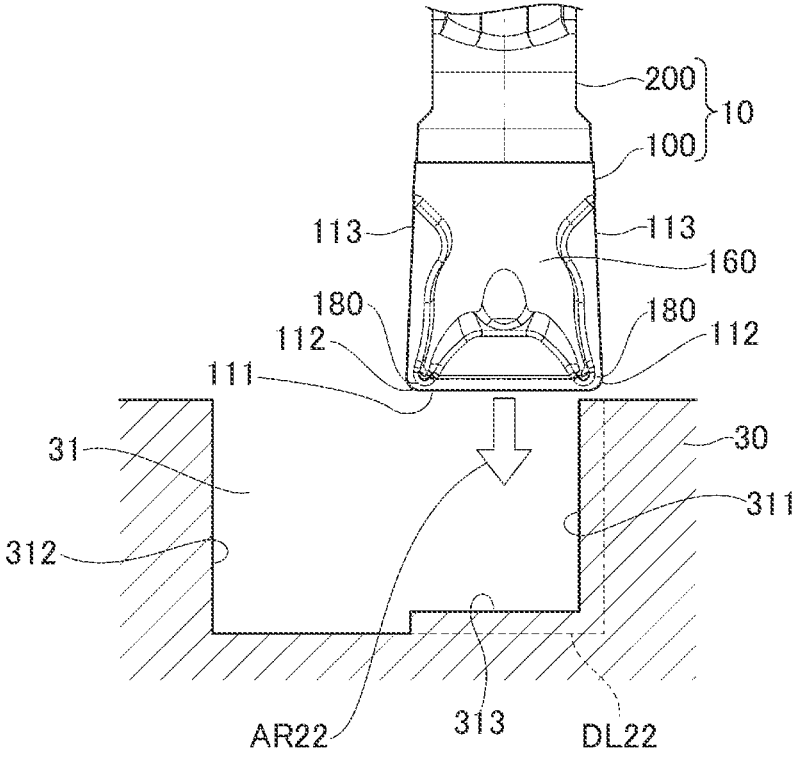

Finishing fabrication of the groove 31 is not limited to the example illustrated in FIG. 5 but may be performed, for example, in an aspect as illustrated in FIGS. 6A-6B. In the examples illustrated in FIGS. 6A-6B, the groove width of the groove 31 is larger than the dimension of the chip 100 in the width direction. In this case, the cutting insert 10 is first moved in the direction of an arrow AR21 as illustrated in FIG. 6A. Accordingly, the inner side surface 312 on one side is provided with finishing fabrication by the corresponding corner cutting edge 112, and then part of the bottom surface 313 is provided with finishing fabrication by the front cutting edge 111. A dotted line DL21 in FIG. 6A represents a part removed from the workpiece 30 through this fabrication.

Subsequently, the cutting insert 10 is moved in the direction of an arrow AR22 as illustrated in FIG. 6B. Accordingly, the inner side surface 311 on the other side is provided with finishing fabrication by the corresponding corner cutting edge 112, and then the remaining part of the bottom surface 313 is provided with finishing fabrication by the front cutting edge 111. A dotted line DL22 in FIG. 6B represents a part removed from the workpiece 30 through this fabrication. Even when finishing fabrication is performed on the groove 31 having a relatively large width as described above, the same effect as described above in the example illustrated in FIG. 5 is achieved.

In the examples illustrated in FIGS. 6A-6B, the groove width of the groove 31 is equal to or smaller than twice of the dimension of the chip 100 in the width direction. Finishing fabrication is performed by a method illustrated in FIGS. 7A-7B when the groove width of the groove 31 exceeds twice of the dimension of the chip 100 in the width direction.

Figures 7A, 7B:
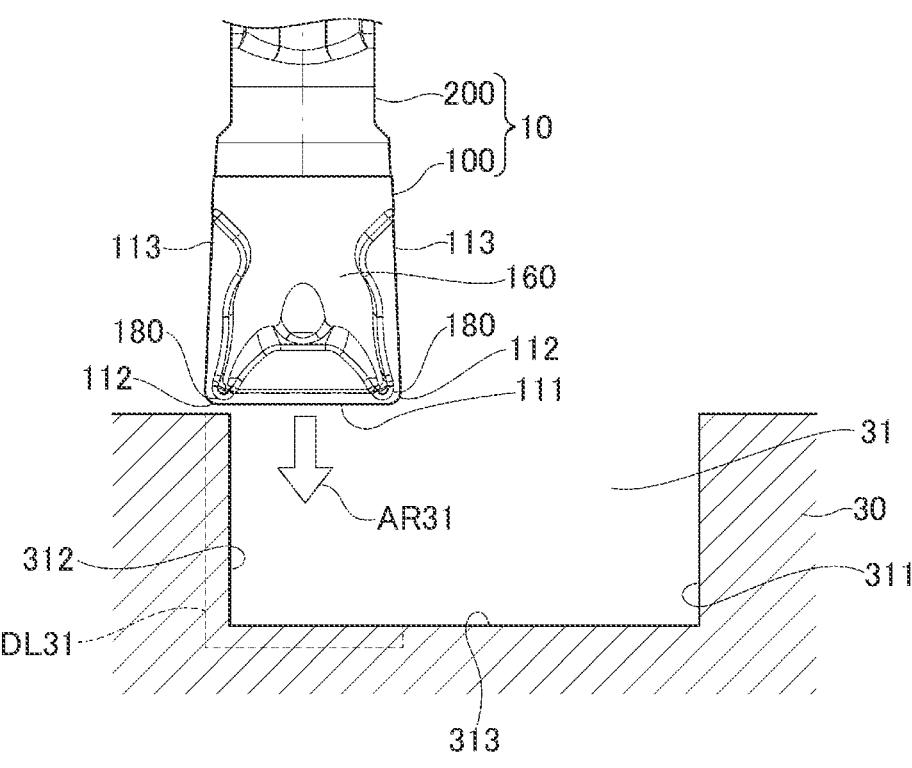
FIGS. 7A-7B are diagrams for describing an aspect of groove machining performed by the cutting insert according to the present embodiment.

First, the cutting insert 10 is moved in the direction of arrow AR31 as illustrated in FIG. 7A. Accordingly, the inner side surface 312 on one side is provided with finishing fabrication by the corresponding corner cutting edge 112, and then part of the bottom surface 313 is provided with finishing fabrication by the front cutting edge 111. A dotted line DL31 in FIG. 7A represents a part removed from the workpiece 30 through this fabrication.

Subsequently, the cutting insert 10 is moved in the direction of arrow AR32 as illustrated in FIG. 7B. Accordingly, the inner side surface 311 on the other side is provided with finishing fabrication by the corresponding corner cutting edge 112. Then, after the front cutting edge 111 reaches the bottom surface 313, the cutting insert 10 is moved in the direction of arrow AR33. Accordingly, the remaining part of the bottom surface 313 is provided with finishing fabrication by the front cutting edge 111. A dotted line DL32 in FIG. 7B represents a part removed from the workpiece 30 through this fabrication.

When the cutting insert 10 is moved in the direction of arrow AR33, finishing fabrication of the bottom surface 313 is performed mainly by the corner cutting edge 112 on the left side in FIGS. 7A-7B. Chip generated at the corner cutting edge 112 in this case is fragmented by the first corner wall surface 181 and the second corner wall surface 182 as in the example described above with reference to FIG. 5. The fabrication condition in this process is often set low, and thus an effect of the configuration of the corner wall surfaces 180 as in the present embodiment can be more largely exerted.

Each corner wall surface 180 that functions as a chip breaker is also applicable to a cutting insert having a configuration different from that in the present embodiment. For example, instead of cBN, diamond may be employed as the material of the chip 100. Moreover, a part called a "wiper", a "flat cutting edge", or the like may be formed at each flank surface 102 and its vicinity.

The present embodiment is described above with reference to specific examples. However, the present disclosure is not limited to these specific examples. Those obtained by changing designing of the specific examples as appropriate by the skilled person in the art are included in the scope of the present disclosure as long as they have features of the present disclosure. Each element included in each above-described specific example and, for example, the disposition, condition, and shape thereof are not limited to those exemplarily shown but may be changed as appropriate. Combination of elements included in the above-described specific examples may be changed as appropriate without technological inconsistency.

What is claimed is:

1. A cutting insert used for groove machining, the cutting insert comprising:

a front cutting edge;

a pair of side cutting edges;

a pair of corner cutting edges each connecting the front cutting edge and a corresponding one of the side cutting edges;

corner rake surfaces extending from the corner cutting edges; and a protrusion part protruding from the corner rake surfaces and provided with a flat boss surface at a leading end, wherein an entirety of the boss surface is flat, corner wall surfaces extending from the boss surface toward the corner rake surfaces are disposed at the protrusion part, at least a part of the corner wall surfaces has a tilt angle of 40° or larger relative to the boss surface, the corner wall surfaces each includes a first corner wall surface and a second corner wall surface, the first corner wall surface being a part on the boss surface side, the second corner wall surface being a part on the corner rake surface side, a tilt angle of the second corner wall surface relative to the boss surface is smaller than a tilt angle of the first corner wall surface relative to the boss surface, and an entirety of the first corner wall surface continuously extends away from the corner rake surface and toward a plane which includes the flat boss surface.

2. The cutting insert according to claim 1, wherein, when viewed in a direction perpendicular to the boss surface, at least one of the first corner wall surface and the second corner wall surface protrudes in a circular arc shape toward the corner cutting edges.

3. The cutting insert according to claim 1, wherein a first part being provided with the front cutting edge, the side cutting edges, the corner cutting edges, the corner rake surfaces, and the protrusion part, and a second part being held by a holder of a cutting tool are joined to each other.

4. The cutting insert according to claim 3, wherein the first part is formed of a material containing cubic boron nitride.

5. The cutting insert according to claim 1, wherein an entirety of the second corner wall surface continuously inclines away from the corner rake surface towards the first corner wall surface and the plane which includes the flat boss surface.

6. The cutting insert of claim 1, wherein an entirety of the second corner wall surface is between the corner cutting edge and the flat boss surface.

* * * * *